March 19, 1968 G. L. BEERS 3,374,310

COLOR TELEVISION RECEIVER WITH SIMULTANEOUS BRIGHTNESS AND COLOR SATURATION CONTROLS

Filed Aug. 23, 1965 2 Sheets-Sheet 1

INVENTOR.
GEORGE L. BEERS

March 19, 1968 G. L. BEERS 3,374,310

COLOR TELEVISION RECEIVER WITH SIMULTANEOUS BRIGHTNESS AND COLOR SATURATION CONTROLS

Filed Aug. 23, 1965 2 Sheets-Sheet 2

INVENTOR.
GEORGE L. BEERS

United States Patent Office 3,374,310

Patented Mar. 19, 1968

3,374,310

COLOR TELEVISION RECEIVER WITH SIMULTANEOUS BRIGHTNESS AND COLOR SATURATION CONTROLS

George L. Beers, 410 Peyton, Ave., Haddonfield, N.J. 08033

Filed Aug. 23, 1965, Ser. No. 481,817
12 Claims. (Cl. 178—5.4)

ABSTRACT OF THE DISCLOSURE

A color television reproducing system is provided with a master control which permits the average brightness of the reproduced color image to be varied as desired while maintaining the subjective saturation of the reproduced color image substantially unaltered. This is accomplished by causing the color saturation control of the color television reproducing system to vary simultaneously with the brightness control.

This invention relates to television image reproducing apparatus and particularly to apparatus for reproducing television images in color.

The color television system presently standardized in the United States employs a composite video signal including a luminance component and a chrominance component. The color television receivers which have been produced to receive the standardized color television signals have been provided with a plurality of controls to enable the user to vary the subjective quality of the reproduced images. The controls on typical color television receivers which are used to alter the subjective quality of the reproduced color television images are:

A hue or tint control to vary the hue or color of reproduced images. The typical hue or tint control has a range which permits the color of the skin of individuals to be varied from lavender through a normal flesh tone to green.

A color control by which the color component in the reproduced image can be varied in intensity. This control usually has a range which at one end removes all color from the reproduced image and at the other end increases the intensity of the color component in the reproduced image to such an extent that even the pastel areas in the image are reproduced as saturated colors. Some intermediate position of the control provides color components of the proper value to reproduce the color television image in life-like color.

A contrast control by which the luminance component in the reproduced image can be varied so that the monochrome or black and white values in the television image are reproduced with the proper gradation.

A brightness control which makes it possible to adjust the average brightness of the picture to a desired value.

Unfortunately, the effect of these controls is not independent of the characteristics which are varied by the other controls. For example, when a color television image is being reproduced and the brightness of the image is increased by adjusting the brightness control the subjective color values in the reproduced image are reduced, i.e., those areas in the picture which were reproduced in relatively vivid or saturated color become pastel. This decrease in the saturation of color areas in the reproduced image is due to the fact that the brightness control increases the average picture brightness of the reproduced image by subjectively introducing white light into the reproduced image.

A vivid or saturated color is one which is not diluted by white light. A pastel color is one which has been diluted by white light. To compensate for the subjective dilution of the color values in the reproduced image resulting from adjustment of the brightness control to increase the average picture brightness it is necessary to adjust the color control to increase the color components in the picture. In order to obtain optimum picture quality from a color television receiver a series of adjustments is frequently necessary in which the brightness control and color control are adjusted alternatively. Likewise, it is frequently necessary to readjust the contrast control to compensate for the subjective effect of a change in adjustment of the brightness control.

When color slides or color movies are projected the brightness of the image can be increased by changing the wattage or size of the projection lamp. Since these lamps are designed for a desired color temperature the color values and contrast in the projected images are independent of the size of the projection lamp. In other words, changing from a 300 watt to a 500 watt projection lamp in a color slide or motion picture projector does not change the color saturation or contrast in the projected image assuming that the ambient light is relatively low in the room in which the images are projected.

As previously stated, altering the average brightness of the reproduced image in a color television reproducing system causes other characteristics of the reproduced image to vary so that a readjustment of other controls is required to obtain satisfactory reproduction of the color television image.

It is an object of this invention to provide in a color television reproducing system means for adjusting the average brightness of the reproduced image which will not affect other characteristics of the reproduced image when the average brightness of the image is varied.

It is a further object of this invention to simplify the adjustment of color television receivers by providing a master control by which the average brightness of reproduced images can be varied without altering the color saturation or contrast in the reproduced image.

It is another object of the invention to provide means to maintain the subjective color saturation in a reproduced color television image substantially constant as the average brightness of the reproduced image is varied.

It is a further object of the invention to provide means for varying the brightness control and the color control in a color television receiver simultaneously to maintain the subjective color saturation in a reproduced color television image substantially constant as the average brightness of the reproduced image is varied.

An additional object of the invention is to provide means for varying the brightness control of the color control in a color television receiver simultaneously and means to permit the color control to be varied independently of the brightness control.

The invention will be described more in detail by reference to the accompanying drawing in which.

Figure 1:
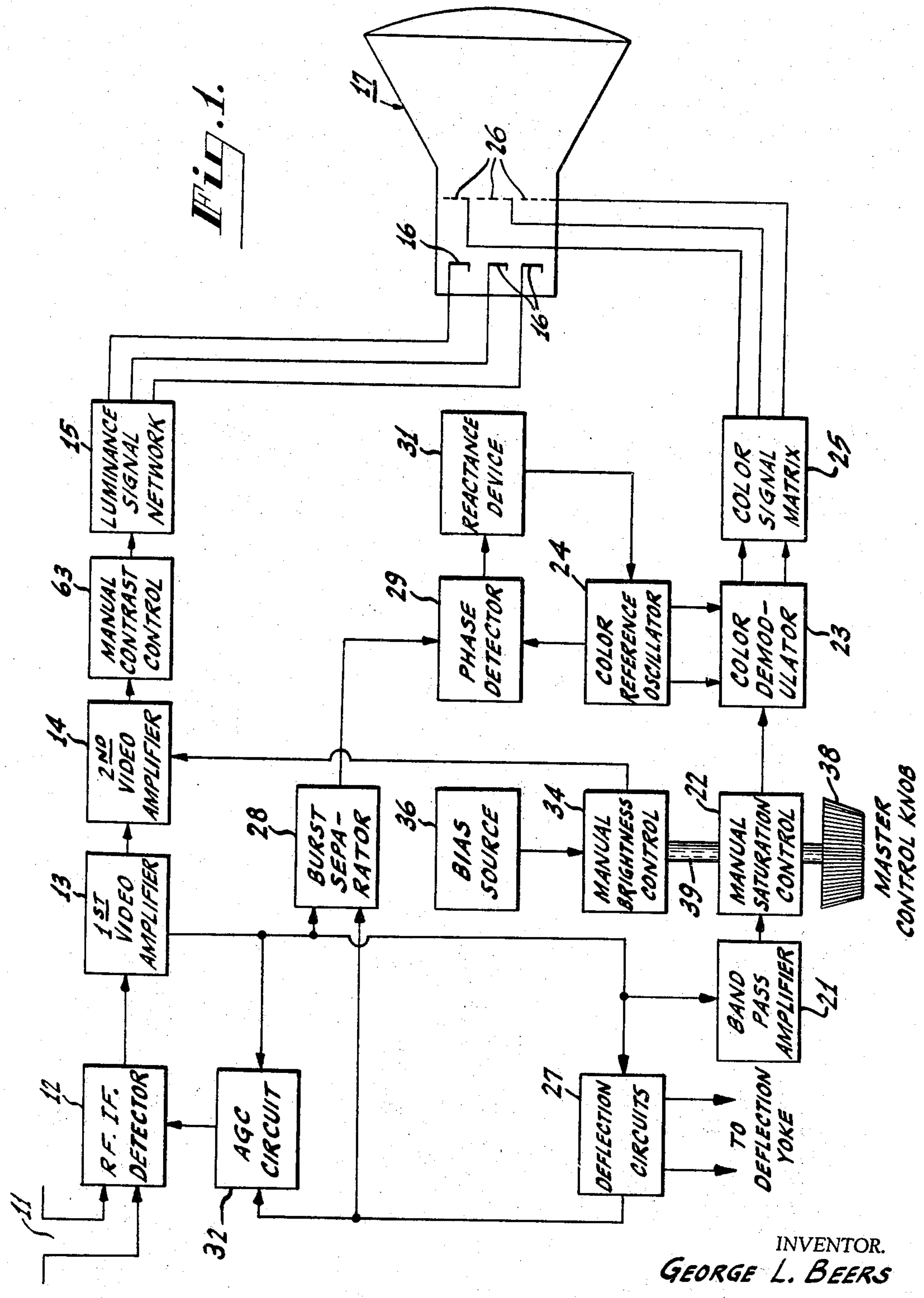
FIGURE 1 is a block diagram of a color television receiver which may be employed to reproduce a color image and which embodies the present invention.

Reference first is made to FIGURE 1. The composite color television signal received by an antenna 11 is processed in the RF, IF and detector circuits 12 to produce a composite video signal comprising luminance and chrominance components, deflection synchronizing pulses and color synchronizing bursts. The composite video signal is amplified in a first video amplifier 13. At least the luminance component is further amplified by a second video amplifier 14 and impressed upon a luminance network 15 in which it is suitably processed in a conventional manner to produce three separate luminance components which may have different amplitudes. These luminance signals are impressed respectively upon the cathodes 16 of the red, green and blue electron guns of a tricolor kinescope 17. Such a kinescope may be a shadow mask kinescope such as the 21CYP22A, the 21FBP22 or the 21FJP22 all of which are presently used in color television receivers.

The chrominance component of the composite video signal is separated by a bandpass amplifier 21 coupled to the output of the first video amplifier 13 as is customary. The amplifier 21 responds substantially only to that portion of the composite signal including the color subcarrier and its modulation sidebands. The output of the bandpass amplifier is coupled through a manual saturation control 22 to a color demodulator 23 which also receives suitable phases of a demodulating color reference wave from a color reference oscillator 24. The color representative signals derived from the color demodulator 23 are suitably combined in a color signal matrix 25 to produce red, green and blue color difference signals which are impressed upon the control grids 26 of the color kinescope 17. By means of the luminance signals impressed upon the cathodes and the color difference signals impressed upon the control grids of the three electron guns of the color kinescope the electron beams are modulated suitably to represent the red, green and blue color components of the image to be reproduced.

The deflection synchronizing pulses of the received composite signal are employed to control deflection of the electron beams of the color kinescope 17 in a conventional manner. This is accomplished by coupling the deflection circuits 27 to the output of the first video amplifier 13 for the derivation of the synchronizing pulses. The deflection circuits utilize these pulses in a conventional manner to energize the deflection yoke (not shown) provided for the color kinescope.

The output of the first video amplifier 13 also is coupled to a burst separator 28 which functions under the control of keying pulses derived from the deflection circuits 27 to separate the color synchronizing bursts from the composite signal. These bursts are impressed upon a phase detector 29 together with the color reference wave derived from the color reference oscillator 24. Any deviation in phase of the color reference wave from the bursts is detected and used to bring the reference wave oscillations into phase by means of a reactance device 31 coupled between the phase detector 29, and the frequency and phase controlling circuits of the color reference oscillator 24.

The output of the first video amplifier 13 also is coupled to an AGC circuit 32 which is of the keyed variety. It is keyed into operation by means of keying pulses derived from the deflection circuits 27 to, in effect, sense the amplitude of the received horizontal synchronizing pulses. The AGC circuit 32 functions to produce a negative unidirectional voltage which varies in accordance with any variations in the amplitude of the horizontal synchronizing pulses and is impressed upon the gain controlling circuits of the RF and IF amplifiers so as to maintain the composite signal derived from the detector substantially constant in strength.

A manual brightness control 34, which may include a potentiometer (not shown in detail) is employed to vary the bias of the second video amplifier 14. The amplifier 14 is DC coupled to kinescope 17 in such a way that the bias of the color kinescope 17 of FIGURE 1 is controlled by the bias applied to amplifier 14. Thus the overall brightness of the image produced by the color kinescope 17 is controlled by varying the bias of the second video amplifier 14 through the use of the manual brightness control 34. A bias source 36 provides a bias voltage to be varied by the control 34.

The conventional tint or hue control (not shown in the drawing for simplicity) enables the phase of the voltage derived from the color reference oscillator and applied to the color demodulator to be varied to effect any desired change in tint or hue.

Referring now to FIGURE 1, the master control knob 38 is provided as a means in accordance with the invention for adjusting the average brightness of the image reproduced in color on the face of kinescope 17. The master control knob 38 is attached to a shaft 39 which causes both the manual color saturation control 22 and the manual brightness control 34 to be varied simultaneously when the knob 38 is rotated. The degree of control provided by the manual brightness control 34 and the manual saturation control 22 are so proportioned that as the average image brightness is varied the color components applied to the grids 26 of the kinescope 17 are also varied to maintain the subjective color saturation of the reproduced image substantially unaltered. In other words, the color saturation of the reproduced color television image remains substantially independent of the average brightness to which the image has been adjusted.

Figures 2, 3, 4, 5:
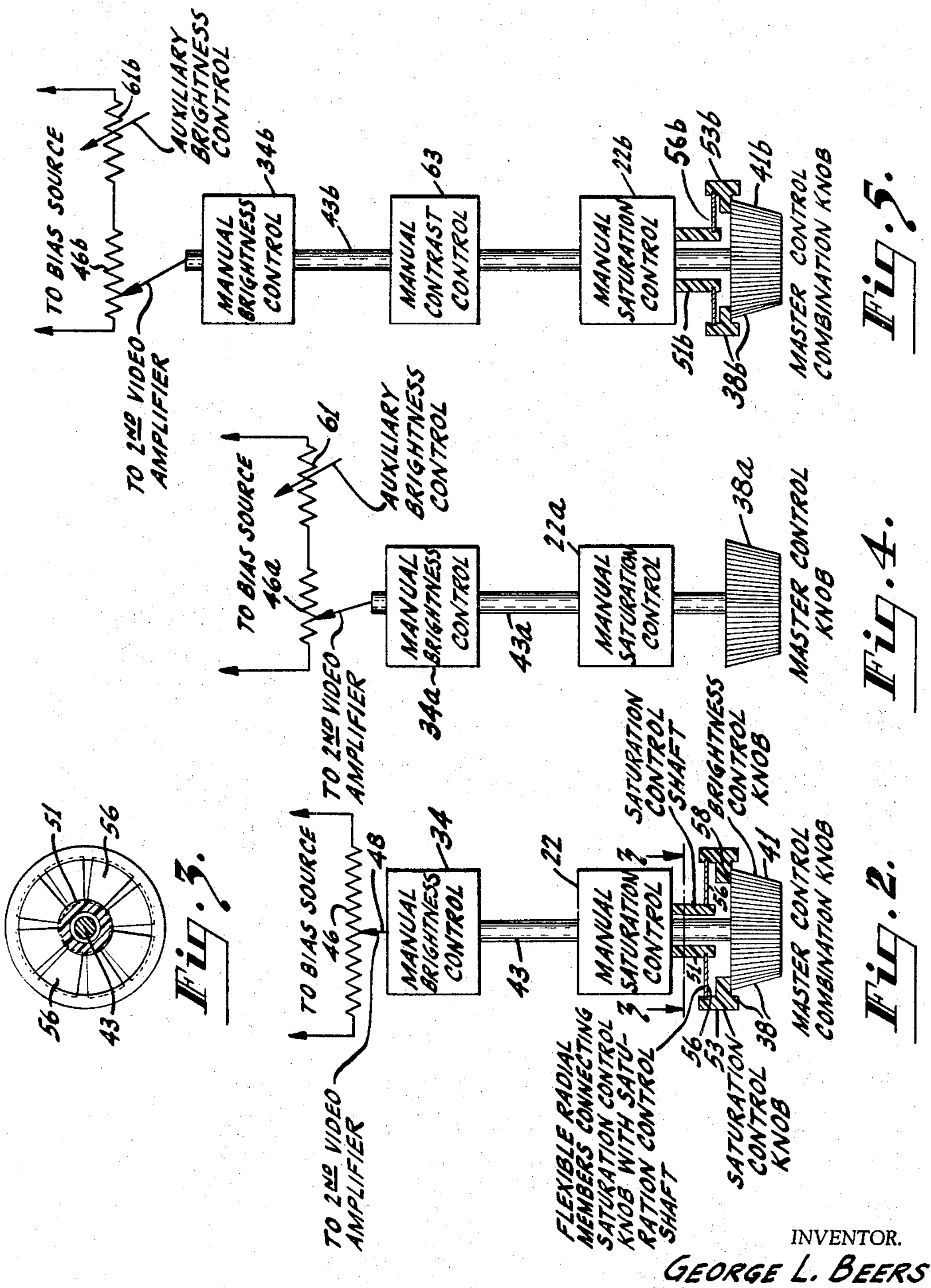
FIGURE 2 is a schematic circuit diagram of a part of the color television receiver of FIGURE 1 illustrating a feature of the invention whereby the overall image brightness of the picture may be varied while maintaining the color saturation of the reproduced image substantially unaltered.
FIGURE 3 is a partial section on line 3—3 of FIGURE 2 as viewed in the direction of the arrows.
FIGURE 4 is a schematic showing of one modification of the invention.
FIGURE 5 is a schematic showing of another modification.

Referring now to the modification shown in FIGURES 2 and 3, the master control knob 38 comprises a brightness control knob 41 which drives the manual brightness control 34 through a suitable means illustrated as the shaft 43. The manual brightness control 34 comprises a potentiometer, shown as a resistor 46 and a movable contact arm 48. The resistor 46 is a part of or is connected to the bias source 36.

The master control knob 38 also comprises a saturation control knob 53 provided with a hollow shaft 51 in which the shaft 43 is nested. Flexible radial members 56 connect the saturation control knob 53 with the hollow shaft 51. These radial members are in the form of springs pressing the friction clutch face 58 of the knob 53 against the circumferential inner face of the knob 41.

FIGURE 3 shows the pie-shaped flexible radial members 56 which support the knob 53 on the hollow shaft 51. The members 56 are sufficiently rigid that a fixed relationship is maintained between the knob 53 and the hollow shaft 51 as the knob 53 is rotated. However, the radial members 56 are flexible in a direction perpendicular to the surface of FIGURE 3.

Turning the master control combination knob 38 will cause the knobs 41 and 53 to turn and thus effect simultaneous adjustment of saturation and brightness by reason of the frictional engagement between the clutch face 58 and the circumferential surface of the knob 41. This provides a master control by which as the average brightness of the reproduced image is varied the color components in the reproduced image are also varied so that the subjective color saturation of the reproduced image is maintained substantially independent of the brightness of the reproduced image. Color saturation may be separately adjusted by pressing the knob 53 axially inwardly and turning it. Thus by pressing the knob 53 axially inwardly and turning it any desired initial relationship between color saturation and image brightness can be obtained. When the inward pressure on the knob 53 is then released the knobs 53 and 41 will turn simultaneously as the master control knob 38.

A modification is shown in FIGURE 4 accomplishing the master control function electrically instead of mechanically. The shaft **43*a* of the knob 38*a* turns both the manual saturation control 22*a* and the manual brightness control 34*a*. An initial compensating adjustment, corresponding in function to the friction means of FIGURE 2, provides for separate adjustment of the manual brightness control whereby it will function properly when operated simultaneously with the saturation control. The compensating adjustment is in the form of a variable resistor 61 in series with the potentiometer resistor 46a**.

It will be obvious that by varying the resistance of variable resistor 61 the voltage at the potentiometer contact arm can be shifted as desired to provide the proper relationship between brightness and saturation and thus compensate for variations between color television image reproducing devices or variations between transmitting stations. After the initial compensating adjustment has been made a proper relationship between average image brightness and color saturation will be maintained as the average image brightness is varied so that the color saturation remains substantially independent of the average image brightness.

It will also be apparent that with either the master control arrangement shown in FIGURE 2 or FIGURE 4 and desired relationship between the degree of control provided and angular displacement of the control knob can be obtained for either the brightness control or the color saturation control. For example, the distribution of the resistance in the potentiometer 46 or 46a can be varied to give any desired relationship between control voltage and angular displacement of the knob 38 or 38a. The brightness and color saturation controls can thus be made to provide the proper relationship to maintain the color saturation of the reproduced image substantially independent of the average brightness to which the reproduced image has been adjusted.

FIGURE 5 shows another modification. The manual saturation control 22b, manual brightness control 34b and the manual contrast control 63 (also shown in FIGURE 1) are aligned axially. The manual contrast control 63 and the manual brightness control 34b are operated simultaneously by a shaft 43b which carries the knob 41b. A hollow shaft 51b, similar to 51 in FIGURE 2, is connected to the knob 53b by flexible radial members 56b. This modification provides a master control by which color saturation and contrast in a reproduced color television image are maintained substantially unaltered as the average image brightness is varied. In the FIGURE 5 modification an initial compensating adjustment between color saturation and contrast is provided by the friction clutch of the master control combination knob which comprises the knobs 41b and 53b. Initial compensating adjustment between contrast and image brightness is provided by the auxiliary brightness control 61b. These compensating adjustments make it possible to obtain any desired initial relationship between color saturation, contrast and average image brightness. After the initial compensating adjustment has been made the master control will function to maintain the subjective quality of the reproduced image with respect to color saturation and contrast substantially unaltered as the average brightness of the image is varied.

What is claimed is:

1. In a color television receiver including an image reproducing device for reproducing television images in color, the combination comprising means for controlling the average brightness of the image reproduced by said image reproducing device, means to control the color saturation of the reproduced image and means to cause the said color saturation control means and said brightness control means to vary simultaneously so that the subjective color saturation of the reproduced image remains substantially constant as the brightness control means is varied.

2. In a color television receiver including an image reproducing device for reproducing television images in color, the combination comprising means for controlling the average brightness of the image reproduced by said image reproducing device, means to control the color saturation of the reproduced image and means to cause the said color saturation control means and said brightness control means to vary simultaneously so that the subjective color saturation of the reproduced image remains relatively independent of the brightness of the reproduced image as the brightness control means is varied.

3. In a color television receiver including an image reproducing device for reproducing television images in color, the combination comprising means for controlling the average brightness of the image reproduced by said image reproducing device, means to control the color saturation of the reproduced image and means to cause said color saturation control means and said brightness control means to vary simultaneously so that the subjective color saturation of the reproduced image remains relatively independent of the brightness of the reproduced image as the brightness control means is varied and means to permit the color saturation of the reproduced image to be adjusted independently of said brightness control means to compensate for variations in image reproducing devices.

4. In a color television receiver including an image reproducing device for reproducing television images in color, the combination comprising means for controlling the average brightness of the image reproduced by said image reproducing device, means to control the color saturation of the reproduced image, means to control the contrast of the reproduced image and means to cause said contrast control means and said color saturation control means and said brightness control means to vary simultaneously so that the contrast and the color saturation of the reproduced image remains relatively independent of the brightness of the reproduced image as the brightness control means is varied.

5. In a color television receiver including an image reproducing device for reproducing television images in color, the combination comprising means for controlling the average brightness of the image reproduced by said image reproducing device, means to control the color saturation of the reproduced image, means to control the contrast of the reproduced image, means to cause said contrast control means and said color saturation control means and said brightness control means to vary simultaneously so that the contrast and the color saturation of the reproduced image remains relatively independent of the brightness of the reproduced image as the brightness control means is varied and means to permit relative adjustment between said brightness control means, said color saturation control means and said contrast control means.

6. A color television receiver comprising an image reproducing tube having a plurality of cathodes, a separate grid associated with each cathode, a first signal path for supplying a video signal simultaneously to said cathodes, a brightness control in said first signal path for simultaneously varying a bias on said grids to control the average brightness of said image reproducing tube, a second signal path for supplying a different image signal to each grid, each signal representing a different color, means in said second signal path for deriving said color representing signals, a saturation control in said second signal path, manually operable means for simultaneously adjusting said brightness control and said saturation control.

7. A color television receiver comprising an image reproducing tube having a plurality of cathodes, a separate grid associated with each cathode, a first signal path for supplying a video signal simultaneously to said cathodes, a brightness control in said first signal path for simultaneously varying the bias on said grids to control the average brightness of said image reproducing tube, a second signal path for supplying a different image signal to each grid, each signal representing a different color, means in said second signal path for deriving said color representing signals, a saturation control in said second signal path, manually operable means for simultaneously adjusting said brightness control and said saturation control and means for separately adjusting one of said controls while leaving said other control in its previous condition of adjustment.

8. A color television receiver comprising an image reproducing tube having a plurality of cathodes, a separate grid associated with each cathode, a first signal path for supplying a video signal simultaneously to said cathodes, a brightness control in said first signal path for simultaneously varying the bias on said grids to control the average brightness of said image reproducing tube, a second signal path for supplying a different image signal to each grid, each signal representing a different color, means in said second signal path for deriving said color representing signals, a saturation control in said second signal path, manually operable means for simultaneously adjusting said brightness control and said saturation control and clutch means for separately adjusting said saturation control while leaving said brightness control in its previous condition of adjustment.

9. A color television receiver comprising an image reproducing tube having a plurality of cathodes, a separate grid associated with each cathode, a first signal path for supplying a video signal simultaneously to said cathodes, a brightness control in said first signal path for simultaneously varying the bias on said grids to control the average brightness of said image reproducing tube, a second signal path for supplying a different image signal to each grid, each signal representing a different color, means in said second signal path for deriving said color representing signals, a saturation control in said second signal path, manually operable means for simultaneously adjusting said brightness control and said saturation control and electrical means associated with said brightness control for separately adjusting the average brightness of the reproduced image while maintaining the adjustment of the saturation control.

10. A color television receiver comprising an image reproducing tube having a plurality of cathodes, a separate grid associated with each cathode, a first signal path for supplying a video signal simultaneously to said cathodes, a brightness control in said first signal path for simultaneously varying the bias on said grids to control the average brightness of said image reproducing tube, a second signal path for supplying a different image signal to each grid, each signal representing a different color, means in said second signal path for deriving said color representing signals, a saturation control in said second signal path, manually operable means for simultaneously adjusting said brightness control and said saturation control and electrical means associated with said brightness control for changing the relationship between the average brightness of the reproduced image and the color saturation of said reproduced image.

11. In a color television receiver including an image reproducing device for reproducing television images in color, a first control for varying the average brightness of a reproduced television image, said control when varied causing undesired effects on the color saturation of a reproduced television image, a second control for varying the color saturation of a reproduced television image and means for causing said first control and said second control to vary simultaneously so that the undesired effects of said first control on said color saturation of a reproduced television image are substantially compensated.

12. In a color television receiver including an image reproducing device for reproducing television images in color, a first control for varying the average brightness of a reproduced television image, said contol when varied causing undesired effects on the color saturation of a reproduced television image, a second control for varying the color saturation of a reproduced television image, means for causing said first control and said second control to vary simultaneously so that the undesired effects of said first control on said color saturation of a reproduced television image are substantially compensated and means for separately adjusting one of said controls while leaving said other control in its previous condition of adjustment.

References Cited

UNITED STATES PATENTS

| | | | |
|---|---|---|---|
| 2,310,671 | 2/1943 | Batchelor | 178—7.5 |
| 2,880,266 | 3/1959 | Parker | 178—5.4 |
| 3,128,334 | 4/1964 | Heuer | 178—5.4 |

ROBERT L. GRIFFIN, *Primary Examiner.*

JOHN W. CALDWELL, *Examiner.*

J. A. O'BRIEN, R. MURRAY, *Assistant Examiners.*